Feb. 15, 1927. 1,617,627
M. J. FRAMBACH
TIRE CHAIN LINK
Filed Feb. 19, 1926
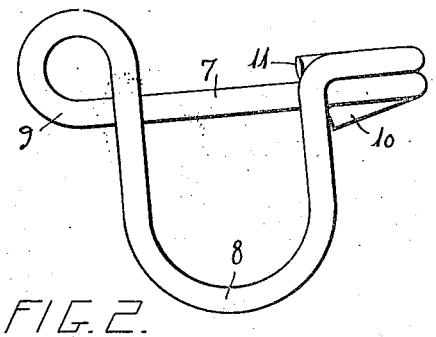
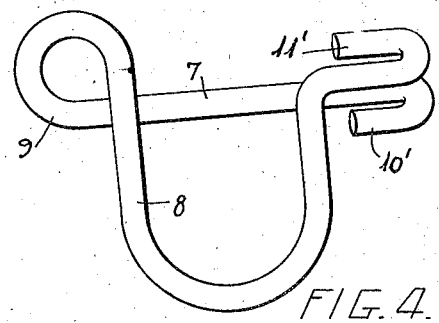
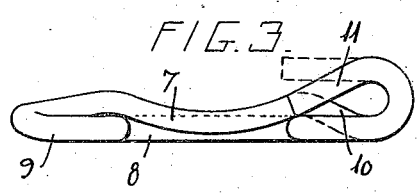
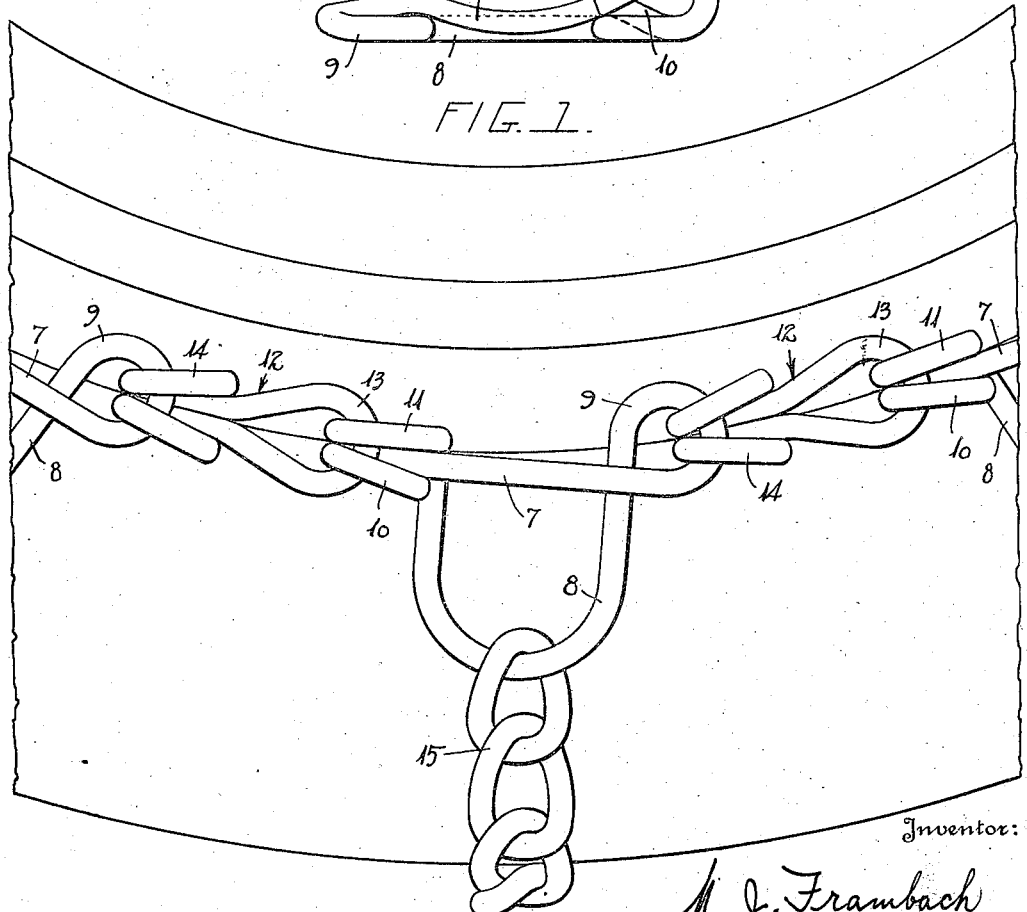
Inventor:
M. J. Frambach
By Monroe E. Miller
Attorney.

Patented Feb. 15, 1927.

1,617,627

UNITED STATES PATENT OFFICE.

MATHEW J. FRAMBACH, OF HARTLEY, IOWA, ASSIGNOR OF ONE-THIRD TO ELMER NEEBEL AND ONE-THIRD TO JACOB B. OLHAUSEN, OF HARTLEY, IOWA.

TIRE-CHAIN LINK.

Application filed February 19, 1926. Serial No. 89,426.

The present invention relates to chain links adapted especially for use in tire chains, and is an improvement over the tire chain links disclosed in my Patents Nos. 1,439,303 and 1,505,635, dated December 19, 1922, and Aug. 19, 1924, respectively.

The object of the invention is the provision of a novel and improved link to be used in the longitudinal side chains of a tire chain structure for the connection of the cross or tread chain, in order to afford a convenient assemblage of the longitudinal and cross chains, to prevent the tangling thereof when handled or stored, and to prevent the links from opening up or pulling apart when the chains are subjected to considerable strains.

A further object is the formation of the link in such a manner as not to chafe or injure the side wall of the tire casing, and also in order not to be opened up or injured by the rubbing of the chains against a curb or other object when the wheel moves close to such curb or object.

A still further object is to construct the link from a length of wire or similar stock with the terminals of the wire forming hooks at one end of the longitudinal portion of the link and a loop or eye at the opposite end of the longitudinal portion, for connecting the link in the longitudinal chain, with a loop intermediate said hooks and first-named loop for the engagement of the cross chain.

When the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a fragmentary side elevation of a tire chain structure embodying the improved links.

Fig. 2 is an inside elevation of the improved link.

Fig. 3 is an edge view of the link, looking down on the link as shown in Fig. 2.

Fig. 4 is a perspective view of a link having a modified arrangement of hooks.

As well known, tire chain devices, as generally used, consist in longitudinal retaining chains at opposite sides of the tire, and cross or transverse tread chains connected to the longitudinal chains to extend across the tire.

In carrying out the invention, the links of the longitudinal chains, to which the cross chains are connected, are of special formation. Each link is bent from a rod or length of stout wire, and has the longitudinal portion 7 and a loop 8 of U-shape or other suitable form with its arms crossing the portion 7 at one side of and near the ends of the portion 7. One end of the portion 7 and corresponding arm of the loop 8 are connected by a loop or eye 9, and the opposite end of the portion 7 and opposite arm of the loop 8 constitute the terminals of the wire and are bent back into hooks 10 and 11, respectively. The loop 8 is at the inner side of the portion 7 to bear against the side wall of the tire casing, so as to provide a smooth contact of the link with the tire and prevent chafing or injuring the tire. The eye 9 and loop 8 are disposed at opposite sides of the portion 7, and said eye is in substantially the same plane with the loop 8 and portion 7 so that the link may lay snugly against the side of the tire or wheel. The hooks 10 and 11 are bent back outwardly, and the terminal of the hook 10 extends under the portion 7 while the terminal of the hook 11 extends above the portion 7, as seen in Fig. 1. The hooks 10 and 11 are thus bent to opposite sides of the portion 7 to prevent said hooks catching on a curb or other object against which the wheel may rub or contact.

The hooks 10 and 11 are located at the outer side of the plane in which the loop 8 and eye 9 are disposed, with said hooks in planes substantially at right angles with the aforesaid plane.

As shown, the aforesaid links are connected by links 12 which have loops or eyes 13 engaging the hooks 10 and 11, and hooks 14 engaging the eyes 9. This provides a longitudinal chain of rugged and strong construction. The hooks 14 are also bent back outwardly to avoid chafing the tire, and are bent apart to the opposite sides of the intermediate portions of the links 12. If desired, the hooks 10 and 11 of each of the improved links may engage through the eye 9 of the companion link, without using the intermediate links 12.

The cross chains 15 engage the loops 8 of the improved links.

When the hooks 10 and 11 are open, as seen in dotted lines in Fig. 3, the cross chains 15 may be readily slipped over the hooks 11 onto the loops 8, and the links of the longitudinal chains then assembled, after which the hooks 10 and 11 are bent closed. The portion 7 of each link may also be pressed or bent between the arms of the loop, as seen in Fig. 3. The portion 7 of the improved link takes up the longitudinal strain between the eye 9 and hooks 10, 11. The hook 11 contacting with the portion 7 and hook 10 at that side opposite to the bend of the loop 8, will prevent the link from opening up due to strains between the longitudinal and cross chains. The hook 11 being against the portion 7 and hook 10 will prevent the loop 8 from pulling or springing away from the portion 7. The improved link is therefore exceedingly strong and will not pull open even under excessive strains, and the terminal portions or hooks 10 and 11 of the link are made to contact all the more tightly the greater the strains are to which the link is subjected.

The improved links may oscillate in the planes thereof when the cross chains 15 come into and move out of engagement with the road or pavement, and the cross chains may also shift longitudinally of the tire tread on the loops 8, to enable the device to creep around the tire, as well as obtaining a good gripping action between the cross chains and tire tread.

Fig. 4 illustrate a modification, in that the hook 10' at the end of the portion 7 is bent back inwardly, reversely to the hook 11' which is bent back outwardly the same as the hooks 10 and 11 hereinbefore described. The hooks 10' and 11' are shown as open prior to the assembly of the link with the other links. When the hook 10' is closed the end thereof is bent outwardly toward the portion 7, while the end of the hook 11' is bent inwardly.

Having thus described the invention, what is claimed as new is:—

1. A chain link formed from a length of wire having adjacent hooks constituting the terminals of the wire, an opposite eye, and a loop connecting said eye and one hook, said eye and loop being disposed in substantially the same plane, and the hooks being disposed at one side of and in planes at an angle to the aforesaid plane.

2. A chain link formed from a length of wire having a longitudinal portion, a loop, an eye connecting one end of said portion and an arm of the loop, and hooks at the other end of said portion and other arm of said loop and constituting the terminals of the wire, said eye and loop being located at opposite sides of the longitudinal portion in substantially the same plane.

3. A chain link formed from a length of wire having a longitudinal portion, a loop having its arms crossing said longitudinal portion, and an eye connecting one end of said portion and one arm of said loop, the other end of said portion and other arm of said loop having hooks adjacent to one another.

4. A chain link formed from a length of wire having a longitudinal portion, a loop whose arms cross said portion at the inner side thereof, an eye connecting one end of said portion and one arm of said loop, a hook at the other end of said portion, and a hook at the end of the other arm of the loop bearing against said portion and first-named hook opposite to the bend of said loop.

5. A chain link formed from a length of wire having a longitudinal portion, hooks constituting the terminals of the wire at one end of said portion, an eye at the other end of said portion, and a loop between said eye and hooks, said eye and loop being located at opposite sides of the longitudinal portion in substantially the same plane.

6. A chain link formed from a length of wire having a longitudinal portion, a hook on one end of said portion, an eye at the other end of said portion, a loop having one arm connected to said eye and having its other arm crossing said longitudinal portion, and a hook on the last named arm of said loop adapted to bear against the first named hook at that side thereof opposite to the loop.

In testimony whereof I hereunto affix my signature.

MATHEW J. FRAMBACH.